US011832028B2

(12) United States Patent
Madden et al.

(10) Patent No.: US 11,832,028 B2
(45) Date of Patent: Nov. 28, 2023

(54) DOORBELL AVOIDANCE TECHNIQUES

(71) Applicant: ObjectVideo Labs, LLC, Tysons, VA (US)

(72) Inventors: Donald Gerard Madden, Columbia, MD (US); Ethan Shayne, Clifton Park, NY (US)

(73) Assignee: ObjectVideo Labs, LLC, Tysons, VA (US)

( * ) Notice: Subject to any disclaimer, the term of this patent is extended or adjusted under 35 U.S.C. 154(b) by 7 days.

(21) Appl. No.: 17/685,831

(22) Filed: Mar. 3, 2022

(65) Prior Publication Data
US 2022/0295019 A1 Sep. 15, 2022

Related U.S. Application Data

(60) Provisional application No. 63/159,721, filed on Mar. 11, 2021.

(51) Int. Cl.
*H04N 7/18* (2006.01)
*G08B 3/10* (2006.01)
*G06V 20/52* (2022.01)
*G10L 15/18* (2013.01)
*G08B 5/14* (2006.01)

(52) U.S. Cl.
CPC ............ *H04N 7/186* (2013.01); *G06V 20/52* (2022.01); *G08B 3/10* (2013.01); *G08B 5/14* (2013.01); *G10L 15/1815* (2013.01)

(58) Field of Classification Search
CPC .......... H04N 7/186; G06V 20/52; G08B 3/10; G08B 5/14; G08B 13/1672; G10L 15/1815
See application file for complete search history.

(56) References Cited

U.S. PATENT DOCUMENTS

| 5,570,083 | A | 10/1996 | Johnson |
| 5,673,016 | A | 9/1997 | Lutes |
| 6,218,938 | B1 | 4/2001 | Lin |
| 8,154,391 | B1 | 4/2012 | Morris |
| 8,786,425 | B1 | 7/2014 | Hutz |
| 10,289,917 | B1* | 5/2019 | Fu ................... G08B 13/19602 |
| 10,990,499 | B2* | 4/2021 | Moeller ............... H04L 9/3234 |
| 11,064,167 | B2* | 7/2021 | Siminoff ............... G06V 40/16 |
| 11,086,493 | B2* | 8/2021 | Badr ....................... G06F 3/011 |
| 11,158,067 | B1* | 10/2021 | Modestine ............. G06T 7/292 |
| 11,468,721 | B2* | 10/2022 | Conrad ............. G07C 9/00571 |
| 2003/0179096 | A1 | 9/2003 | Hanan |

(Continued)

OTHER PUBLICATIONS

U.S. Appl. No. 15/428,576, Jackson et al., filed Feb. 9, 2017.

*Primary Examiner* — Jared Walker
(74) *Attorney, Agent, or Firm* — Fish & Richardson P.C.

(57) ABSTRACT

Methods, systems, and apparatus, including computer programs encoded on computer storage media, for reducing a likelihood that a doorbell might be used. One of the methods includes determining that a visitor arrived at a premises; determining that the visitor used a computing device at a first time; determining that a user device of a person of the premises received a message at a second time; determining that the first time and the second time both satisfy a timing criteria; and in response to determining that the first time and the second time both satisfy the timing criteria, sending, to the user device, a notification that indicates that the visitor arrived at the premises.

20 Claims, 3 Drawing Sheets

(56) References Cited

U.S. PATENT DOCUMENTS

| | | |
|---|---|---|
| 2005/0007451 A1 | 1/2005 | Chiang |
| 2010/0148957 A1 | 6/2010 | Ortiz et al. |
| 2010/0289618 A1 | 11/2010 | Crucs |
| 2010/0289644 A1 | 11/2010 | Salvin et al. |
| 2011/0148653 A1 | 6/2011 | Lin et al. |
| 2015/0156031 A1* | 6/2015 | Fadell .................. G08B 27/003 700/90 |
| 2015/0163412 A1 | 6/2015 | Holley et al. |
| 2015/0341603 A1 | 11/2015 | Kasmir et al. |
| 2015/0347910 A1* | 12/2015 | Fadell .................. H05B 47/115 706/46 |
| 2016/0044287 A1* | 2/2016 | Scalisi .................. H04N 23/51 348/159 |
| 2016/0379458 A1* | 12/2016 | Eyring .................... G08B 3/10 340/5.81 |
| 2020/0267354 A1* | 8/2020 | Siminoff ................ G06V 40/16 |
| 2020/0372773 A1* | 11/2020 | Higley .................. G08B 31/00 |
| 2021/0134100 A1* | 5/2021 | LaRovere .......... G07C 9/00571 |
| 2021/0398139 A1* | 12/2021 | Zhang ................ G06Q 30/0201 |
| 2021/0398400 A1* | 12/2021 | Scalisi ............... H04N 1/00164 |
| 2022/0021684 A1* | 1/2022 | Mensah ................ H04L 63/105 |
| 2022/0070415 A1* | 3/2022 | Trundle ................... G07C 9/27 |

* cited by examiner

DOORBELL AVOIDANCE TECHNIQUES

CROSS-REFERENCE TO RELATED APPLICATION

This application claims the benefit of U.S. Provisional Application No. 63/159,721, filed on Mar. 11, 2021, the contents of which are incorporated by reference herein.

TECHNICAL FIELD

This disclosure relates to home monitoring technology.

BACKGROUND

Doorbells are used by visitors to indicate when the visitors have arrived at a property. For example, a visitor may press a doorbell at a front door so that a doorbell chime plays within a home and indicates that someone is at the front door.

SUMMARY

Techniques are described for doorbell avoidance. Doorbells can be jarring and unpleasant. And particularly for residences with pets, doorbell ringing can cause chaos. For example, a loud doorbell chime heard throughout a residence may wake up a baby or cause a dog to start barking. This can lead to visitors, particularly younger visitors, to avoid ringing a doorbell in favor of sending a text message on arrival.

Video doorbells may provide for a touchless doorbell where a visitor does not need to press a button to have a doorbell chime play in the residence. For example, a video doorbell may include a camera and automatically ring a doorbell in a residence when the camera detects a visitor at a front door. However, a touchless doorbell may not change the impact on residents within the residence. For example, the doorbell chime may still indiscriminately ring throughout the house when a visitor triggers the doorbell chime.

Instead of ringing a doorbell, a visitor may communicate through messaging applications on their devices, e.g., smartphones, wearables, tablets, etc. For example, a visitor that arrives at a front door may then take out their smartphone and send a text message that says "Here" to a resident of the residence. However, touchless doorbells can still ring the doorbell chime when the visitor arrives at a front door, nullifying the visitor's attempts to not ring the doorbell even if the visitor choses to send a text message instead of pressing the doorbell button.

Additionally, video-based alerting systems might not distinguish between visitors. For example, any visitor approaching the front porch may trigger the same type of notification regardless of whether the visitor is a friend or a delivery person dropping off a package with no need to interact with the resident.

When a visitor sends a message to the resident announcing their arrival, the resident may not be able to immediately prioritize the message compared to other messages or notifications. For example, a text message from a visitor may appear similarly to a non-urgent text message from someone far away. As text messages and messaging services become more of a primary means of communication, there may be a lot of noise induced by messages on a resident's devices.

In some implementations, a system may help indicate to a resident that a visitor has arrived based on specially identifying a message that the resident receives. For example, the system may determine that a text message of "Here" was received on a resident's smartphone within ten seconds of the visitor having taken out their smartphone and, in response, show the text message on the resident's smartphone with a predetermined notification. The predetermined notification can be flashing, e.g., of the text message or a notification banner, a textual indicator of "Likely at front door," or some other indication that is different than for a typical message received on the resident's smartphone.

In general, one aspect of the subject matter described in this specification can be embodied in methods that include the actions of determining that a visitor arrived at a premises; determining that the visitor used a computing device at a first time; determining that a user device of a person of the premises received a message at a second time; determining that the first time and the second time both satisfy a timing criteria; and in response to determining that the first time and the second time both satisfy the timing criteria, sending, to the user device, a notification that indicates that the visitor arrived at the premises.

Other embodiments of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Determining that the first time and the second time both satisfy the timing criteria can include determining that the first time and the second time are at most a threshold time apart. Determining that the visitor used the computing device at the first time can include: analyzing, using object recognition, an image that depicts the visitor at the first time; and determining that the image depicts the visitor holding the computing device.

In some implementations, determining that the visitor used the computing device at the first time can include analyzing an audio signal that encodes sound captured during at least the first time; and determining, using speech recognition, that the audio signal encodes a predetermined phrase. The method can include determining that a second visitor arrived at the premises; determining that the second visitor used a second computing device at a third time; determining that a type of the second computing device is not a predetermined type; and in response to determining that the type of the second computing device is not a predetermined type, determining to skip sending, to a second user device of a second person of the premises, a second notification that indicates that the visitor has arrived at the premises.

In some implementations, the method can include determining that a second visitor arrived at the premises; determining that the second visitor did not use a second computing device within a threshold period of time of arriving at the premises; and in response to determining that the second visitor did not use a second computing device within the threshold period of time of arriving at the premises, determining to skip sending, to a second user device of a second person of the premises, a second notification that indicates that the visitor has arrived at the premises. The user device can be the same user device as the second user device.

In some implementations, the method can include determining that a second visitor arrived at the premises; determining that the second visitor used a second computing device at a third time; determining that a second user device of a second person of the premises received a message at a fourth time; determining that the third time and the fourth time do not satisfy the timing criteria; and in response to determining that the third time and the fourth time do not satisfy the timing criteria, determining to skip sending, to the second user device, a second notification that indicates that the visitor has arrived at the premises. The second user device can be a different user device than the user device.

This specification uses the term "configured to" in connection with systems, apparatus, and computer program components. That a system of one or more computers is configured to perform particular operations or actions means that the system has installed on it software, firmware, hardware, or a combination of them that in operation cause the system to perform those operations or actions. That one or more computer programs is configured to perform particular operations or actions means that the one or more programs include instructions that, when executed by data processing apparatus, cause the apparatus to perform those operations or actions. That special-purpose logic circuitry is configured to perform particular operations or actions means that the circuitry has electronic logic that performs those operations or actions.

The subject matter described in this specification can be implemented in various embodiments and may result in one or more of the following advantages. In some implementations, the systems and methods described in this specification can reduce energy usage, computational resource usage, or both, by prioritizing messages presented on a user device. This can occur when a system sends a message to a user device that indicates that a visitor arrived at a residence when one or more timing criteria are satisfied compared to other systems that don't send such a message, user devices that present multiple messages without considering priority, or both. This can reduce energy and computational resource usage by reducing doorbell usage, reducing a likelihood that multiple messages are sent between devices, reducing a likelihood that multiple notifications about a single message are presented, or a combination of these.

In some implementations, the systems and methods described in this specification can notify a resident more quickly about a visitor than other systems. This can result in a faster response time for the resident to respond to the visitor. In some implementations, by prioritizing messages about a visitor, the systems and methods described in this specification can reduce a number of messages presented to a user, e.g., saving computational resources accordingly. This can reduce an amount of "mental noise" for a resident who is expecting a visitor, e.g., the resident need only pay attention to a prioritized message and need not interact with other incoming messages. Similarly, the systems and methods described in this specification can reduce an amount of in-home "chaos" caused by an unintended touchless doorbell chime ring, e.g., by presenting notifications on a user device about a visitor instead of activating a doorbell chime ring throughout a premises.

In some implementations, the systems and methods described in this specification can improve incoming message prioritization. For example, by prioritizing messages with information about a visitor at a premises, the systems and methods described in this specification can more quickly surface relevant information to a resident, reduce a likelihood of presenting multiple notifications about the visitor, present information about the visitor more efficiently, or a combination of these. Information about a visitor can be presented more efficiently by presenting a notification about a visitor fewer times than might otherwise be the case in systems that do not prioritize notifications about visitors.

The details of one or more embodiments of the subject matter described in this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
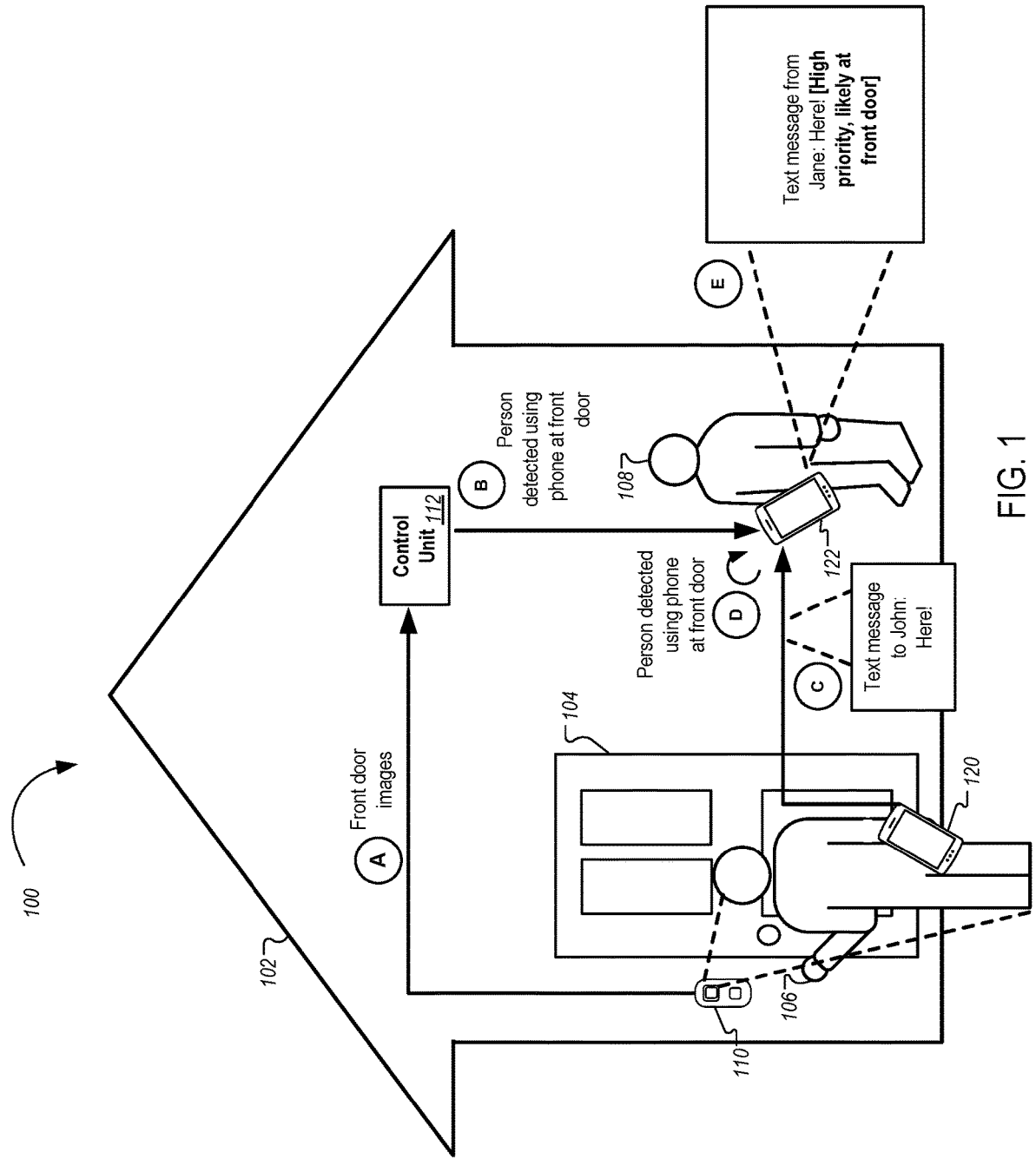
FIG. 1 illustrates a diagram of an example system that enables doorbell avoidance.

FIG. 1 illustrates a diagram of an example system 100. The system 100 includes a camera 110 that captures images of visitors that arrive at a front door 104 of a residence 102, a control unit 112 that detects, using the images, when a visitor 106 arrives at the front door 104, a visitor device 120 that a visitor 106 uses to send a message to a resident 108, and a resident device 122 that receives the message from the visitor device 120 and is used by the resident 108. Although the examples described with respect to FIG. 1 relate to a premises as the residence 102, the systems and methods described in this specification relate to any appropriate type of premises, such as an office building.

The camera 110 captures images of visitors that arrive at a front door 104. For example, the camera 110 may be a doorbell camera that is embedded within a doorbell that is located next to the front door 104 of a residence. In another example, the camera 110 may be a standalone camera that is positioned above the front door 104 and pointed downwards towards the ground in front of the front door 104. The camera 110 may provide images to the control unit 112. For example, the camera 110 may provide a continuous stream of images to the control unit 112. The camera 110 can provide the images over a wired connection. In another example, the camera 110 may only provide images to the control unit 112 when the camera 110 detects motion. The camera 110 may provide the images wirelessly over a, e.g., home, wireless network or a cellular connection.

The control unit 112 may receive the images and determine when a visitor uses the visitor device 120 using the images. For example, the control unit 112 may detect that a human at the front door has started looking at a rectangular object in their hand. In another example, the control unit 112 may detect that a human at the front door is using their thumbs or fingers to press on a surface of a device, e.g., a smartphone, held in the human's hand.

In response to determining that a visitor 106 used the visitor device 120, the control unit 112 may provide an indication that the visitor used the visitor device 120 to the resident device 122. For example, the control unit 112 may provide at 11:22:33 (11:23 AM and 33 seconds) an indication of "A visitor at the front door used their device" to the resident device 122. In another example, the control unit 112 may provide an indication of "A visitor at the front door used their device at 11:22:33" to the resident device 122. The indication might not be displayed on the resident device 122, and instead the resident device 122 can use data about the indication to determine how to handle a message from the visitor device 120, another device, or both.

The visitor device 120 may be used by the visitor 106 to send a message to the resident device 122. For example, the visitor 106 may interact with the visitor device 120 to send a Short Message Service (SMS) text message of "Here!" to the resident device 122 over a cellular network. In another example, the visitor 106 may interact with the visitor device 120 to send a message through another messaging service, across another type of network, or both.

The resident device 122 may receive the message from the visitor device 120 and the indication from the control unit 112, and determine whether to notify the resident 108 that the visitor 106 has arrived at the residence 102. For example, the resident device 122 may receive the message of "Here!" sent by the visitor device 120 and the indication of "Person detected using phone at front door" from the control unit 112, and, in response, continuously flash the message on a screen of the resident device 122. In another example, the resident device 122 may receive the message of "Here!" sent by the visitor device 120 and the indication of "Person detected using phone at front door at 11:22:33" from the control unit 112, and, in response, make a beeping sound and add a text label of "[High priority, likely at front door]" to the message. The resident device 122 can receive any appropriate combination of data from the visitor device 120 and the control unit 112 that both indicate that a person is likely at the residence 102 and present a notification, whether audible, visible or both, in response. The resident device 122 can present the notification to the resident 108.

The resident device 122 may determine whether to notify the resident 108 that the visitor 106 has arrived at the residence 102 based on determining that the message was received by the resident device 122 around the same time that the control unit 112 detected a visitor at the front door 104, e.g., when the message was received within a threshold period of time of the visitor detection. For example, the resident device 122 may determine to include the text label of "[High priority, likely at front door]" based on determining that a message was received on the resident device 122 within twenty seconds of the visitor 106 using the visitor device 120 at the front door 104.

In another example where a delivery person that is not intending to interact with the resident 108 arrives and uses a handheld device to indicate that a package was delivered, the resident device 122 may receive the indication of "Person detected using a handheld device at front door" from the control unit 112 but not receive a message, e.g., data that indicates a doorbell press, within twenty seconds, and, in response, determine to not notify the resident 108 that the visitor 106 has arrived. Accordingly, the system 100 might not cause the resident 108 to think the front door 104 needs to be opened for the delivery person. In some implementations, the resident device 122 may still provide a notification that a package was delivered, but that notification may appear differently than a message that indicates that a visitor that likely intends to interact with the resident has arrived. For example, the resident device 122 may receive a notification from the control unit 112 that indicates a package has been detected at the front door 104 but the notification may not include a text label of "[High priority, likely at front door]."

When the resident device 122 receives multiple messages substantially concurrently, e.g., within a second threshold period of time, the resident device 122 can use data from the control unit 112, from the messages themselves, or both, to determine a priority of the messages. For instance, the resident device 122 can receive two messages within the second threshold period of time. A first message can be from a second device operated by a friend and indicate "how are you doing?" A second message can be from the visitor 106 and indicate "here!" When the resident device 122 receives data from the control unit 112 indicating a "Person detected using phone at front door", the resident device 122 can determine to prioritize the second message over the first message, e.g., even though the resident device 122 may have received the first message before the second message. The resident device 122 can prioritize the second message over the first message by presenting the second message before presenting the first message, by presenting the second message more prominently than the first message, by presenting a different alert for the second message than the first message, or a combination of two or more of these.

If the resident device 122 had not received the data from the control unit 112 that indicated that "Person detected using phone at front door", the resident device 122 can present the messages as it would in any other situation. For instance, the resident device 122 can determine to present the messages in an order by which the messages were received, using default notification settings, or both. This can occur when the resident device 122 receives a prank message from a friend's device, an accidently sent message from another device, e.g., one sent to the wrong person or sent too soon, or in some other situation.

In some implementations, the actions described above as being performed by the resident device 122 may be performed by an application installed on the resident device 122. For example, an application installed on the resident device 122 may receive indications when messages are received on the resident device 122 without having access to the content of the messages, and may receive the indications from the control unit 112.

In some implementations, the actions described above as being performed by the resident device 122 may be at least partially performed by the control unit 112. For example, the resident device 122 may provide notifications to the control unit 112 when a message is received on the resident device 122, and the control unit 112 may use the notifications from the resident device 122 to determine whether the visitor 106 was detected using the visitor device 120 within the threshold period of time of the message being received. If so, the control unit 112 may provide a notification to the resident device 122 that the message is likely from someone at the front door and high priority.

In some implementations, the system 100 may recognize the visitor 106 and provide different notifications on the resident device 122 based on the identity of the visitor 106. For example, the resident 108 may specify in advance different sounds, flashing patterns, or text to provide in a notification for different visitors and the resident device 122 may output the notifications based on what the resident 108 previously specified.

In some implementations, the system 100 may recognize visitors based on images of the visitors provided by the resident 108. For example, the resident 108 may upload five images that each show a single respective friend of the resident 108, and the control unit 112 may then recognize the visitors based on the uploaded images.

In some implementations, the system 100 may recognize visitors based on when the visitors are scheduled to arrive. For example, the resident 108 may provide calendar information that indicates when a friend is expected to arrive at the residence 102 to the control unit 112, and the control unit 112 may then compare an image of a visitor at the front door 104 to only the previously uploaded image of the friend that is scheduled to arrive at the current time to determine whether the friend has arrived.

In some implementations, a virtual doorbell button on an application installed on the visitor device 120 may be used to notify the resident 108 that the visitor 106 has arrived. For example, if the visitor device 120 and the resident device 122 both have the application installed on their phones, then the visitor 106 could use a "virtual doorbell button" built into the application that would send a notification directly to the resident device 122, specifically notifying the resident device 122 that the visitor 106 is waiting at the door. Furthermore, because the application may identify who sent the notification, the resident device 122 may tell the resident 108 who is at the front door 104.

In some implementations where the application is installed on the visitor device 120, the visitor device 120 may determine its location as the resident's address and, in response, send the message directly to the resident device 122. In some implementations, the visitor device 120 may send a message to a server along with the visitor device's 120 location, and the server may then receive notification from the control unit 112 where the notification indicates that someone is at the door at their particular address, and then the server may determine that the visitor 106 is visiting the resident 108, and send a notification to the residence device 122.

In some implementations, the camera 110 or the control unit 112 may detect a Quick Response (QR) code on the screen of the visitor device 120 when the visitor 106 presses the virtual doorbell button, where the QR code uniquely identifies the visitor 106, the visitor device 120, or both. The control unit 112 may then receive the notification from the visitor device 120, e.g., in response to the visitor device 120 detecting user input selecting the virtual doorbell button, the control unit 112 may then correlate that with the image picked up by the camera 110 to recognize that the visitor 106 is specifically at the porch where the camera 110 is located. In some implementations, rather than send a message to a server, pressing the virtual doorbell button may trigger the visitor device 120 to send a message via Bluetooth or NFC to the camera 110, the control unit 112, or both.

Additionally, the camera 110 may provide an image that be used as a snapshot of the visitor 106 included in the notification shown on the resident device 122. Alternatively, the application on the visitor device 120 may take a selfie using the visitor device 120 at the moment that the visitor device 120 receives input indicating the press the virtual doorbell button.

In some implementations, one of the devices 120, 122 might have a doorbell application installed while the other does not. If the visitor 106 happens to have the application on their visitor device 120 but the resident device 122 does not, the application on the visitor device 120 may send a specialized text message to the resident device 122.

In some implementations, the system 100 may provide notifications that a visitor has arrived based on an application installed on the visitor device 120 and calendar information. For example, the control unit 112 may determine that a visitor is scheduled to arrive at the residence 102 at 1:00 PM. In response, starting at 12:45 AM, the control unit 112 can request location information from an application installed on the visitor device 120. When the control unit 112 determines that the location information indicates that the visitor device 120 is within a threshold distance, e.g., one hundred feet, of the residence 102, the control unit 112 provide a notification to the resident device 122 that the visitor 106 has arrived or is about to arrive.

In some implementations, the system 100 may provide a hierarchy of notifications. For example, the system 100 may initially only notify the resident 108 that the visitor 106 has arrived through the resident device 122, and then, e.g., when one or more threshold criteria are satisfied, notify the resident 108 through a doorbell chime. In some implementations, a determination that the resident 106 has not interacted with the resident device 122 within a predetermined amount time after the resident device 122 provides a notification that a visitor is at the front door 104 can be one example of a threshold criteria. The resident device 122 may determine that the resident 106 has not interacted with the resident device 122 within a predetermined amount time after the notification is provided that a visitor is at the front door 104 and, in response, provide an indication to the control unit 112 that the resident 108 has not interacted with the resident device 122, or taken some other action that indicates the resident 108 saw the message, which may cause the control unit 112 to play the doorbell chime. For example, the system 100 may first provide a notification that a person has arrived through the resident device 122, the resident device 122 may determine that the resident 108 did not interact with the resident device 122 within twenty seconds after the notification was provided, the resident device 122 may then an indication to the control unit 112 that the resident 108 has not interacted with the resident device 122, and, in response, the control unit 112 may then play the doorbell chime.

In some implementations, a resident may specify that instead of notifying on the resident device 122, the resident wants the doorbell chime to immediately play. For example, the control unit 112 may determine that a visitor 106 at the front door 104 was detected using the visitor device 120 and the resident device 122 received a message within a predetermined amount of time of twenty seconds, but the resident 108 has indicated that instead of showing the message with a higher priority, or additionally, the resident 108 wants the doorbell chime to immediately play, and, in response, immediately play the doorbell chime instead of waiting to see if the resident 108 interacts with the resident device 122 or moves towards the front door 104 after the message is received.

In some implementations, the control unit 112 may determine whether to play the doorbell chime based on whether the resident 108 is moving towards the front door 104, interacting with the resident device 122, interacted with a notification about the visitor 106, or a combination of two or more of these. When the control unit 112 determines that the resident 108 is likely aware of the visitor 106, the control unit 112 can determine to skip playing a doorbell chime. The control unit 112 can determine that the resident 108 is likely aware of the visitor 106 when the resident 108 moves toward the front door 104, or another door by which the visitor 106 is located, interacts with the resident device 122, likely opened the notification about the visitor 106, or a combination of two or more of these.

For example, the control unit 112 may receive video from cameras in the residence 102 and determine that a visitor 106 arrived at the property. In some examples, the control unit 112 can determine that the visitor 106 arrived at the property in response to receipt of data indicating selection of a doorbell, whether a virtual doorbell, e.g., as part of an application, or a physical doorbell. The control unit 112 can determine, e.g., using video data or other movement data for the resident 108, that even though the resident device 122 determined that it did not receive data indicating that the resident 108 interacted with the resident device 122 within twenty seconds of providing a notification that the person has arrived, the resident 108 appears to be walking towards the front door 104 so may have heard or otherwise been alerted to the notification and is going to open the front door 104 so not play the doorbell chime, whether as part of a physical doorbell system, a virtual doorbell system, or both.

In another example, the control unit 112 may receive video from cameras in the residence 102 and determine that the resident 108 did not interact with the resident device 122 within twenty seconds of providing a notification that the person has arrived and the resident 108 is still sitting watching a television so may not have heard or seen the notification, and, in response, play the doorbell chime, whether a virtual doorbell chime, e.g., in an application, or a doorbell chime that is part of a physical system.

Additionally or alternatively, the control unit 112 or resident device 122 may determine whether the resident 108 is moving towards the front door 104 using movement data that indicates whether the resident device 122 is moving towards the front door 104. The movement data can include data from an image captured by a camera, gyroscope data, accelerometer data, or a combination of these. For example, the resident device 122 may determine that the resident 108 is moving towards the front door 104 as the resident device 122 is moving towards the front door.

In some implementations, the control unit 112 can determine that the visitor 106 uses the visitor device 120 using non-image data. For instance, the residence 102 can include a microphone, e.g., as part of the doorbell unit. The control unit 112 can receive an audio signal that encodes speech from the microphone. The control unit 112 can analyze the audio signal to determine whether the speech encoded in the audio signal indicates that the visitor 106 likely used the visitor device 120. For example, the control unit 112 can determine whether the speech likely indicates a predetermined voice command, e.g., from multiple predetermined voice commands. The predetermined voice command can include a command to send a text message, e.g., "device, send a text message to friend that says 'here'". When the control unit 112 determines that the speech likely indicates a predetermined voice command, the control unit 112 can determine that the visitor 106 used the visitor device 120. When the control unit 112 determines that the speech likely does not indicate a predetermined voice command, the control unit 112 can determine that the visitor 106 likely did not use the visitor device 120, e.g., and determine to skip sending a notification to the resident device 122, performing additional analysis, or both.

Figure 2:
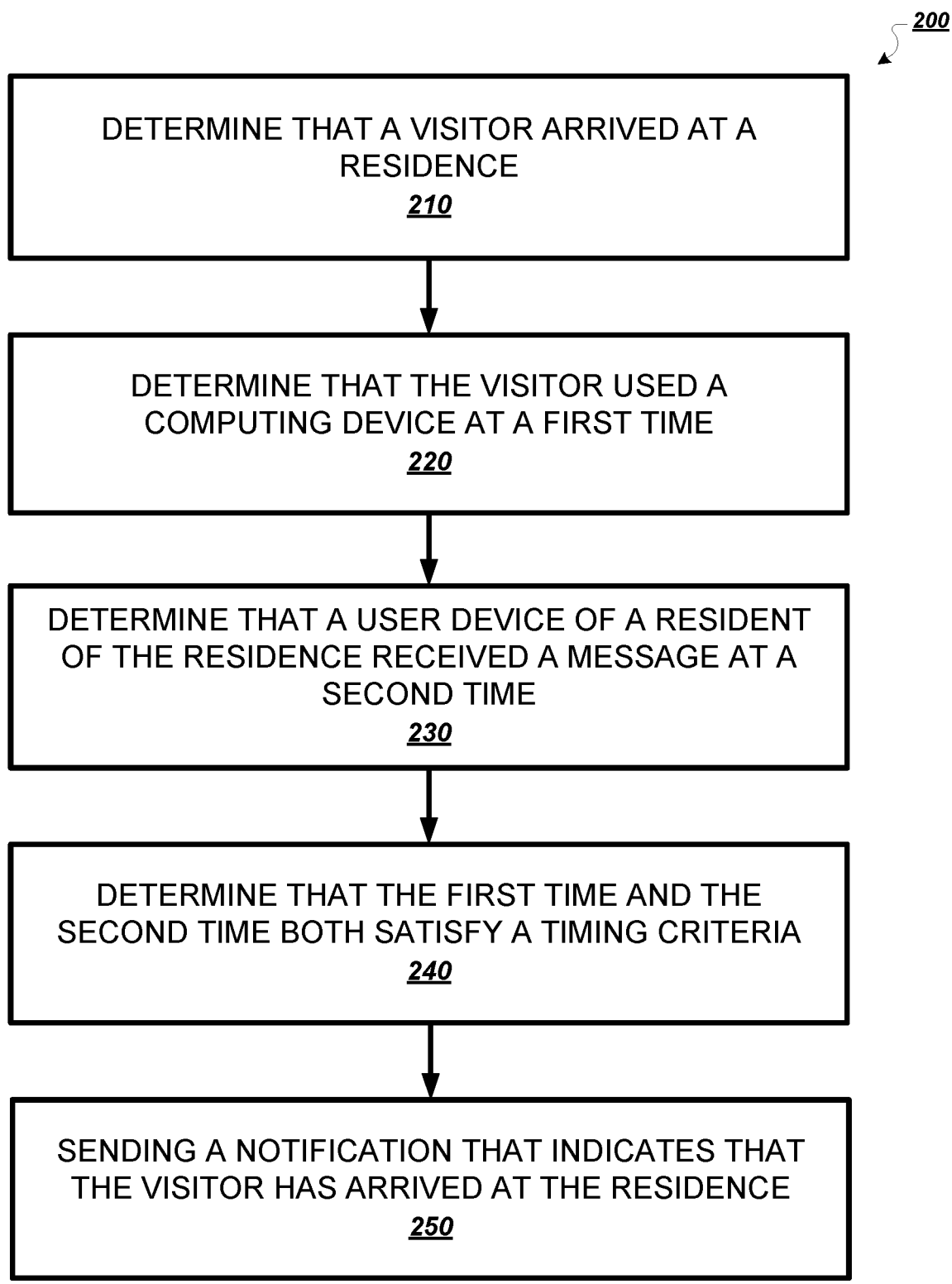
FIG. 2 illustrates a flowchart of an example process that enables doorbell avoidance.

FIG. 2 illustrates a flowchart of an example process 200 that enables doorbell avoidance. The process 200 may be performed by the resident device 122, the control unit 112, some other device, or a combination of these. For example, the process 200 may be performed entirely on the resident device 122 or by a server outside the residence 102 but in communication with the resident device 122.

The process 200 that enables doorbell avoidance includes determining that a visitor arrived at a residence (210). For example, the camera 110 may detect motion, capture an image of the visitor 106 at the front door 104, and then provide the image to the control unit 112. In the example, the control unit 112 may then perform human detection on the image and determine whether a person is depicted in the image. In another, the resident device 122 may receive an indication from the control unit 112 that a person was detected using a phone at the front door 104 at 11:22:33.

The process 200 includes determining that the visitor used a computing device at a first time (220). For example, the camera 110 may continue to capture images and provide the images to the control unit 112. The control unit 112 may use object detection to determine from the images that the visitor 106 started looking at or interacting with the visitor device 120 at 11:22:33. In some examples, the resident device 122 may receive an indication from the control unit 112 that a person was detected using a phone at the front door 104 at 11:22:33.

The process 200 includes determining that a user device of a resident of the residence received a message at a second time (230). For example, the resident device 122 may determine that a message was received at 11:22:35 and then provide an indication to the control unit 112 that a message was received at 11:22:35. In the example, the control unit 112 may receive the indication from the resident device 122 and determine from the indication that the resident device 122 received a message at 11:22:35. In another example, the resident device 122 may determine that a message was received at 11:22:35 and not send any indication to the control unit 112.

The process 200 includes determining that the first time and the second time both satisfy a timing criteria (240). This can include a determination that the first time and the second time are at most a threshold time apart. For example, the control unit 112 may determine that 11:22:33, when the visitor 106 started looking at or interacting with the visitor device 120, and 11:22:35, when the resident device 122 received the message, satisfy a timing criteria of being within twenty seconds of each other. In another example, the resident device 122 may determine that a message was received within twenty seconds of receiving the indication from the control unit 112 that a person was detected using a phone at the front door 104 at 11:22:33.

The process 200 includes sending a notification that indicates that the visitor arrived at the residence (250). The notification can be any appropriate type of notification. For instance, the notification can be a visible notification, an audible notification, or a combination of both.

The control unit 112 may provide an instruction to the resident device 122 to present the message as high priority or with some other special indication so that it is more likely to be detected by the resident 108. In another example, the resident device 122 may determine that a message was received within ten seconds of receiving the indication from the control unit 112 that a person was detected using a phone at the front door 104 at 11:22:33 and, in response, present the message as high priority. As discussed above, the process 200 may include not notifying the resident when the control unit determines that a visitor arrived at the residence but likely does not intend to interact with the resident.

The process 200 can include additional steps, fewer steps, or both. In some examples, some of the steps can be performed in different orders. For instance, the process 200 can include determining that the user device received the message at the second time and then determining that the visitor used the computing device at the first time.

In some implementations, the process 200 can include determining to skip sending a notification to the user device.

The device performing the process 200, e.g., the control unit, can perform this step when the first time and the second time do not satisfy the timing criteria, when the device does not determine that the visitor used a computing device, when the computing device is not of a predetermined type, or a combination of two or more of these.

The predetermined type of device can be any appropriate type of device that sends messages, e.g., text messages or email. For instance, the predetermined type can be a feature phone or a smart phone. In some examples, the predetermined type can be a tablet, a smart watch, a headset, a laptop computer, or another appropriate type of device that can send messages. Some examples of types of devices that are not of the predetermined type can include a package delivery device, e.g., that records data about the delivery of packages; a laptop computer; a toy; or a handheld game console.

Figure 3:
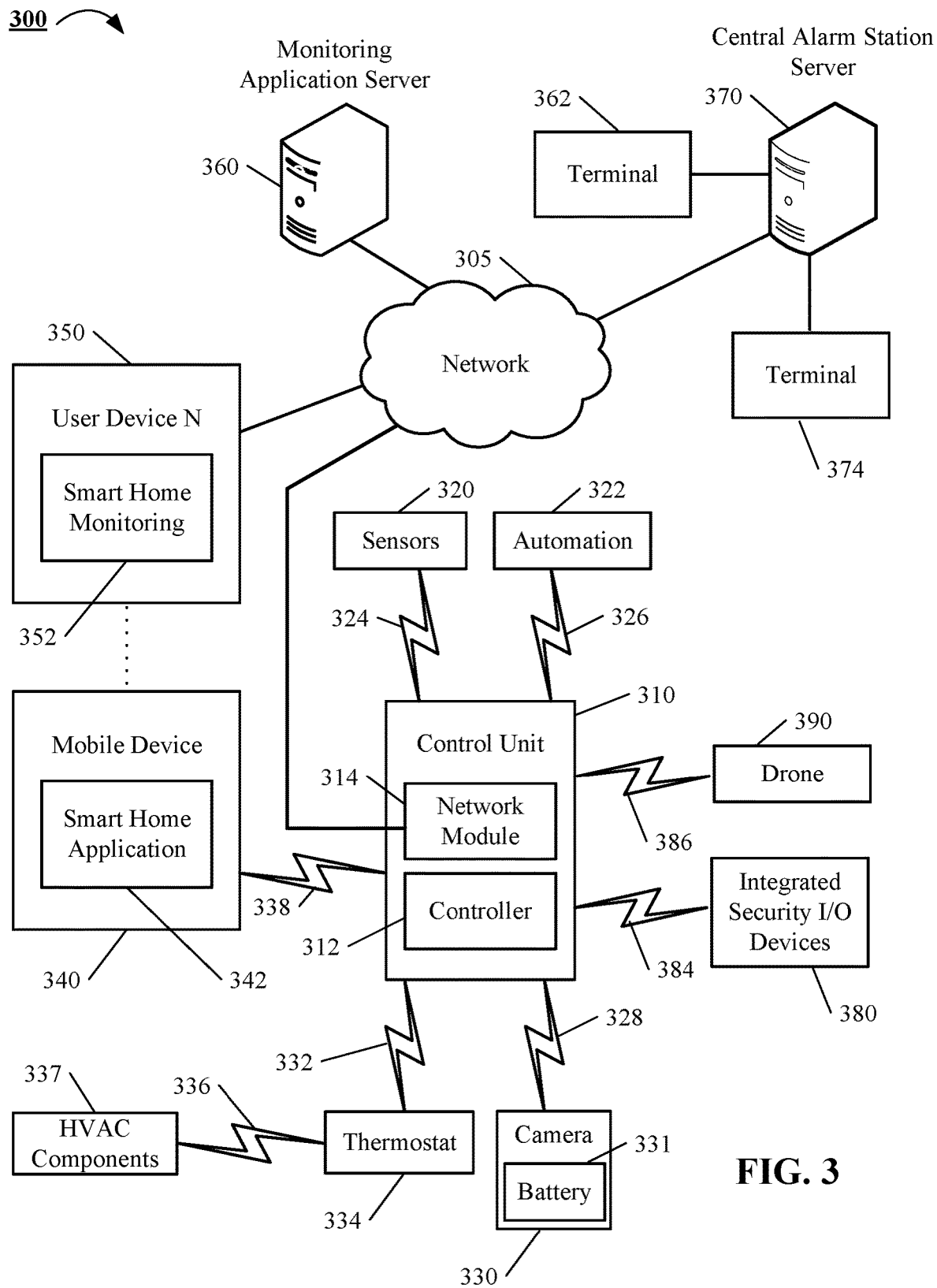
FIG. 3 is a diagram illustrating an example of a property monitoring system.

FIG. 3 is a diagram illustrating an example of a property monitoring system. The electronic system 300 includes a network 305, a control unit 310, one or more user devices 340 and 350, a monitoring application server 360, and a central alarm station server 370. In some examples, the network 305 facilitates communications between the control unit 310, the one or more user devices 340 and 350, the monitoring application server 360, and the central alarm station server 370. The user device 340 may be the visitor device 120, the user device 350 may be the resident device 122, the control unit 310 may be the control unit 112, and the camera 330 may be the camera 105.

The network 305 is configured to enable exchange of electronic communications between devices connected to the network 305. For example, the network 305 may be configured to enable exchange of electronic communications between the control unit 310, the one or more user devices 340 and 350, the monitoring application server 360, and the central alarm station server 370. The network 305 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 305 may include multiple networks or subnetworks, each of which may include, for example, a wired or wireless data pathway. The network 305 may include a circuit-switched network, a packet-switched data network, or any other network able to carry electronic communications (e.g., data or voice communications). For example, the network 305 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 305 may include one or more networks that include wireless data channels and wireless voice channels. The network 305 may be a wireless network, a broadband network, or a combination of networks including a wireless network and a broadband network.

The control unit 310 includes a controller 312 and a network module 314. The controller 312 is configured to control a control unit monitoring system (e.g., a control unit system) that includes the control unit 310. In some examples, the controller 312 may include a processor or other control circuitry configured to execute instructions of a program that controls operation of a control unit system. In these examples, the controller 312 may be configured to receive input from sensors, flow meters, or other devices included in the control unit system and control operations of devices included in the household (e.g., speakers, lights, doors, etc.). For example, the controller 312 may be configured to control operation of the network module 314 included in the control unit 310.

The network module 314 is a communication device configured to exchange communications over the network 305. The network module 314 may be a wireless communication module configured to exchange wireless communications over the network 305. For example, the network module 314 may be a wireless communication device configured to exchange communications over a wireless data channel and a wireless voice channel. In this example, the network module 314 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 314 also may be a wired communication module configured to exchange communications over the network 305 using a wired connection. For instance, the network module 314 may be a modem, a network interface card, or another type of network interface device. The network module 314 may be an Ethernet network card configured to enable the control unit 310 to communicate over a local area network and/or the Internet. The network module 314 also may be a voiceband modem configured to enable the alarm panel to communicate over the telephone lines of Plain Old Telephone Systems (POTS).

The control unit system that includes the control unit 310 includes one or more sensors. For example, the monitoring system may include multiple sensors 320. The sensors 320 may include a lock sensor, a contact sensor, a motion sensor, or any other type of sensor included in a control unit system. The sensors 320 also may include an environmental sensor, such as a temperature sensor, a water sensor, a rain sensor, a wind sensor, a light sensor, a smoke detector, a carbon monoxide detector, an air quality sensor, etc. The sensors 320 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 320 may include a radio-frequency identification (RFID) sensor that identifies a particular article that includes a pre-assigned RFID tag.

The control unit 310 communicates with the module 322 and the camera 330 to perform monitoring. The module 322 is connected to one or more devices that enable home automation control. For instance, the module 322 may be connected to one or more lighting systems and may be configured to control operation of the one or more lighting systems. Also, the module 322 may be connected to one or more electronic locks at the property and may be configured to control operation of the one or more electronic locks (e.g., control Z-Wave locks using wireless communications in the Z-Wave protocol. Further, the module 322 may be connected to one or more appliances at the property and may be configured to control operation of the one or more appliances. The module 322 may include multiple modules that are each specific to the type of device being controlled in an automated manner. The module 322 may control the one or more devices based on commands received from the control unit 310. For instance, the module 322 may cause a lighting system to illuminate an area to provide a better image of the area when captured by a camera 330. The camera 330 can include one or more batteries 331 that require charging. A drone 390 can be used to survey the electronic system 300. In particular, the drone 390 can capture images of each item found in the electronic system 300 and provide images to the control unit 310 for further processing. Alternatively, the drone 390 can process the images to determine an identification of the items found in the electronic system 300.

The camera 330 may be a video/photographic camera or other type of optical sensing device configured to capture images. For instance, the camera 330 may be configured to capture images of an area within a building or within a residence 102 monitored by the control unit 310. The camera 330 may be configured to capture single, static images of the area and also video images of the area in which multiple images of the area are captured at a relatively high frequency (e.g., thirty images per second). The camera 330 may be controlled based on commands received from the control unit 310.

The camera 330 may be triggered by several different types of techniques. For instance, a Passive Infra-Red (PIR) motion sensor may be built into the camera 330 and used to trigger the camera 330 to capture one or more images when motion is detected. The camera 330 also may include a microwave motion sensor built into the camera and used to trigger the camera 330 to capture one or more images when motion is detected. The camera 330 may have a "normally open" or "normally closed" digital input that can trigger capture of one or more images when external sensors (e.g., the sensors 320, PIR, door/window, etc.) detect motion or other events. In some implementations, the camera 330 receives a command to capture an image when external devices detect motion or another potential alarm event. The camera 330 may receive the command from the controller 312 or directly from one of the sensors 320.

In some examples, the camera 330 triggers integrated or external illuminators (e.g., Infra-Red, Z-wave controlled "white" lights, lights controlled by the module 322, etc.) to improve image quality when the scene is dark. An integrated or separate light sensor may be used to determine if illumination is desired and may result in increased image quality.

The camera 330 may be programmed with any combination of time/day schedules, system "arming state", or other variables to determine whether images should be captured or not when triggers occur. The camera 330 may enter a low-power mode when not capturing images. In this case, the camera 330 may wake periodically to check for inbound messages from the controller 312. The camera 330 may be powered by internal, replaceable batteries if located remotely from the control unit 310. The camera 330 may employ a small solar cell to recharge the battery when light is available. Alternatively, the camera 330 may be powered by the controller's 312 power supply if the camera 330 is co-located with the controller 312.

In some implementations, the camera 330 communicates directly with the monitoring application server 360 over the Internet. In these implementations, image data captured by the camera 330 does not pass through the control unit 310 and the camera 330 receives commands related to operation from the monitoring application server 360.

The system 300 also includes thermostat 334 to perform dynamic environmental control at the property. The thermostat 334 is configured to monitor temperature and/or energy consumption of an HVAC system associated with the thermostat 334, and is further configured to provide control of environmental (e.g., temperature) settings. In some implementations, the thermostat 334 can additionally or alternatively receive data relating to activity at a property and/or environmental data at a property, e.g., at various locations indoors and outdoors at the property. The thermostat 334 can directly measure energy consumption of the HVAC system associated with the thermostat, or can estimate energy consumption of the HVAC system associated with the thermostat 334, for example, based on detected usage of one or more components of the HVAC system associated with the thermostat 334. The thermostat 334 can communicate temperature and/or energy-monitoring information to or from the control unit 310 and can control the environmental (e.g., temperature) settings based on commands received from the control unit 310.

In some implementations, the thermostat 334 is a dynamically programmable thermostat and can be integrated with the control unit 310. For example, the dynamically programmable thermostat 334 can include the control unit 310, e.g., as an internal component to the dynamically programmable thermostat 334. In addition, the control unit 310 can be a gateway device that communicates with the dynamically programmable thermostat 334.

A module 337 is connected to one or more components of an HVAC system associated with a property, and is configured to control operation of the one or more components of the HVAC system. In some implementations, the module 337 is also configured to monitor energy consumption of the HVAC system components, for example, by directly measuring the energy consumption of the HVAC system components or by estimating the energy usage of the one or more HVAC system components based on detecting usage of components of the HVAC system. The module 337 can communicate energy-monitoring information and the state of the HVAC system components to the thermostat 334 and can control the one or more components of the HVAC system based on commands received from the thermostat 334.

In some examples, the system 300 further includes one or more robotic devices. The robotic devices may be any type of robots that are capable of moving and taking actions that assist in security-monitoring. For example, the robotic devices may include drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and also roll along the ground, walls, or ceiling) and land vehicle type devices (e.g., automated cars that drive around a property). In some cases, the robotic devices may be robotic devices that are intended for other purposes and merely associated with the system 300 for use in appropriate circumstances. For instance, a robotic vacuum cleaner device may be associated with the monitoring system 300 as one of the robotic devices and may be controlled to take action responsive to monitoring system events.

In some examples, the robotic devices automatically navigate within a property. In these examples, the robotic devices include sensors and control processors that guide movement of the robotic devices within the property. For instance, the robotic devices may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices may include control processors that process output from the various sensors and control the robotic devices to move along a path that reaches the desired destination and avoids obstacles. In this regard, the control processors detect walls or other obstacles in the property and guide movement of the robotic devices in a manner that avoids the walls and other obstacles.

In addition, the robotic devices may store data that describes attributes of the property. For instance, the robotic devices may store a floorplan and/or a three-dimensional model of the property that enables the robotic devices to navigate the property. During initial configuration, the robotic devices may receive the data describing attributes of the property, determine a frame of reference to the data (e.g., a home or reference location in the property), and navigate the property based on the frame of reference and the data describing attributes of the property. Further, initial configuration of the robotic devices also may include learning of one or more navigation patterns in which a user provides input to control the robotic devices to perform a specific navigation action (e.g., fly to an upstairs bedroom and spin around while capturing video and then return to a home charging base). In this regard, the robotic devices may learn and store the navigation patterns such that the robotic devices may automatically repeat the specific navigation actions upon a later request.

In some examples, the robotic devices may include data capture and recording devices. In these examples, the robotic devices may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the property and users in the property. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices to take and store a biometric sample that can be used to identify the person (e.g., a biometric sample with DNA that can be used for DNA testing).

In some implementations, the robotic devices may include output devices. In these implementations, the robotic devices may include one or more displays, one or more speakers, and/or any type of output devices that allow the robotic devices to communicate information to a nearby user.

The robotic devices also may include a communication module that enables the robotic devices to communicate with the control unit 310, each other, and/or other devices. The communication module may be a wireless communication module that allows the robotic devices to communicate wirelessly. For instance, the communication module may be a Wi-Fi module that enables the robotic devices to communicate over a local wireless network at the property. The communication module further may be a 900 MHz wireless communication module that enables the robotic devices to communicate directly with the control unit 310. Other types of short-range wireless communication protocols, such as Bluetooth, Bluetooth LE, Zwave, Zigbee, etc., may be used to allow the robotic devices to communicate with other devices in the property.

The robotic devices further may include processor and storage capabilities. The robotic devices may include any suitable processing devices that enable the robotic devices to operate applications and perform the actions described throughout this disclosure. In addition, the robotic devices may include solid state electronic storage that enables the robotic devices to store applications, configuration data, collected sensor data, and/or any other type of information available to the robotic devices.

The robotic devices are associated with one or more charging stations. The charging stations may be located at predefined home base or reference locations in the property. The robotic devices may be configured to navigate to the charging stations after completion of tasks needed to be performed for the monitoring system 300. For instance, after completion of a monitoring operation or upon instruction by the control unit 310, the robotic devices may be configured to automatically fly to and land on one of the charging stations. In this regard, the robotic devices may automatically maintain a fully charged battery in a state in which the robotic devices are ready for use by the monitoring system 300.

The charging stations may be contact based charging stations and/or wireless charging stations. For contact based charging stations, the robotic devices may have readily accessible points of contact that the robotic devices are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices may charge through a wireless exchange of power. In these cases, the robotic devices need only locate themselves closely enough to the wireless charging stations for the wireless exchange of power to occur. In this regard, the positioning needed to land at a predefined home base or reference location in the property may be less precise than with a contact based charging station. Based on the robotic devices landing at a wireless charging station, the wireless charging station outputs a wireless signal that the robotic devices receive and convert to a power signal that charges a battery maintained on the robotic devices.

In some implementations, each of the robotic devices has a corresponding and assigned charging station such that the number of robotic devices equals the number of charging stations. In these implementations, the robotic devices always navigate to the specific charging station assigned to that robotic device. For instance, a first robotic device may always use a first charging station and a second robotic device may always use a second charging station.

In some examples, the robotic devices may share charging stations. For instance, the robotic devices may use one or more community charging stations that are capable of charging multiple robotic devices. The community charging station may be configured to charge multiple robotic devices in parallel. The community charging station may be configured to charge multiple robotic devices in serial such that the multiple robotic devices take turns charging and, when fully charged, return to a predefined home base or reference location in the property that is not associated with a charger. The number of community charging stations may be less than the number of robotic devices.

Also, the charging stations may not be assigned to specific robotic devices and may be capable of charging any of the robotic devices. In this regard, the robotic devices may use any suitable, unoccupied charging station when not in use. For instance, when one of the robotic devices has completed an operation or is in need of battery charge, the control unit 310 references a stored table of the occupancy status of each charging station and instructs the robotic device to navigate to the nearest charging station that is unoccupied.

The system 300 further includes one or more integrated security devices 380. The one or more integrated security devices may include any type of device used to provide alerts based on received sensor data. For instance, the one or more control units 310 may provide one or more alerts to the one or more integrated security input/output devices. Additionally, the one or more control units 310 may receive one or more sensor data from the sensors 320 and determine whether to provide an alert to the one or more integrated security input/output devices 380.

The sensors 320, the module 322, the camera 330, the thermostat 334, drone 390, and the integrated security devices 380 communicate with the controller 312 over communication links 324, 326, 328, 332, 384, and 386. The communication links 324, 326, 328, 332, 384, and 386 may be a wired or wireless data pathway configured to transmit signals from the sensors 320, the module 322, the camera 330, the thermostat 334, the drone 390, and the integrated security devices 380 to the controller 312. The sensors 320, the module 322, the camera 330, the thermostat 334, the drone 390, and the integrated security devices 380 may continuously transmit sensed values to the controller 312, periodically transmit sensed values to the controller 312, or transmit sensed values to the controller 312 in response to a change in a sensed value. In some implementations, the drone 390 can communicate with the monitoring application server 360 over network 305. The drone 390 can connect and communicate with the monitoring application server 360 using a Wi-Fi or a cellular connection.

The communication links 324, 326, 328, 332, 384, and 386 may include a local network. The sensors 320, the module 322, the camera 330, the thermostat 334, and the integrated security devices 380, and the controller 312 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 3 (CAT6) wired Ethernet network. The local network may be a mesh network constructed based on the devices connected to the mesh network.

The monitoring application server 360 is an electronic device configured to provide monitoring services by exchanging electronic communications with the control unit 310, the one or more user devices 340 and 350, and the central alarm station server 370 over the network 305. For example, the monitoring application server 360 may be configured to monitor events (e.g., alarm events) generated by the control unit 310. In this example, the monitoring application server 660 may exchange electronic communications with the network module 314 included in the control unit 310 to receive information regarding events (e.g., alerts) detected by the control unit server 104a. The monitoring application server 360 also may receive information regarding events (e.g., alerts) from the one or more user devices 340 and 350.

In some examples, the monitoring application server 360 may route alert data received from the network module 314 or the one or more user devices 340 and 350 to the central alarm station server 370. For example, the monitoring application server 360 may transmit the alert data to the central alarm station server 370 over the network 305.

The monitoring application server 360 may store sensor and image data received from the monitoring system and perform analysis of sensor and image data received from the monitoring system. Based on the analysis, the monitoring application server 360 may communicate with and control aspects of the control unit 310 or the one or more user devices 340 and 350.

The central alarm station server 370 is an electronic device configured to provide alarm monitoring service by exchanging communications with the control unit 310, the one or more mobile devices 340 and 350, and the monitoring application server 360 over the network 305. For example, the central alarm station server 370 may be configured to monitor alerting events generated by the control unit 310. In this example, the central alarm station server 370 may exchange communications with the network module 314 included in the control unit 310 to receive information regarding alerting events detected by the control unit 310. The central alarm station server 370 also may receive information regarding alerting events from the one or more mobile devices 340 and 350 and/or the monitoring application server 360.

The central alarm station server 370 is connected to multiple terminals 372 and 374. The terminals 372 and 374 may be used by operators to process alerting events. For example, the central alarm station server 370 may route alerting data to the terminals 372 and 374 to enable an operator to process the alerting data. The terminals 372 and 374 may include general-purpose computers (e.g., desktop personal computers, workstations, or laptop computers) that are configured to receive alerting data from a server in the central alarm station server 370 and render a display of information based on the alerting data. For instance, the controller 312 may control the network module 314 to transmit, to the central alarm station server 370, alerting data indicating that a sensor 320 detected motion from a motion sensor via the sensors 320. The central alarm station server 370 may receive the alerting data and route the alerting data to the terminal 372 for processing by an operator associated with the terminal 372. The terminal 372 may render a display to the operator that includes information associated with the alerting event (e.g., the lock sensor data, the motion sensor data, the contact sensor data, etc.) and the operator may handle the alerting event based on the displayed information.

In some implementations, the terminals 372 and 374 may be mobile devices or devices designed for a specific function. Although FIG. 6 illustrates two terminals for brevity, actual implementations may include more (and, perhaps, many more) terminals.

The one or more user devices 340 and 350 are devices that host and display user interfaces. For instance, the user device 340 is a mobile device that hosts one or more native applications (e.g., the smart home application 342). The user device 340 may be a cellular phone or a non-cellular locally networked device with a display. The user device 340 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 340 may perform functions unrelated to the monitoring system, such as placing personal telephone calls, playing music, playing video, displaying pictures, browsing the Internet, maintaining an electronic calendar, etc.

The user device 340 includes a smart home application 342. The smart home application 342 refers to a software/firmware program running on the corresponding mobile device that enables the user interface and features described throughout. The user device 340 may load or install the smart home application 342 based on data received over a network or data received from local media. The smart home application 342 runs on mobile devices platforms, such as iPhone, iPod touch, Blackberry, Google Android, Windows Mobile, etc. The smart home application 342 enables the user device 340 to receive and process image and sensor data from the monitoring system.

The user device 350 may be a general-purpose computer (e.g., a desktop personal computer, a workstation, or a laptop computer) that is configured to communicate with the monitoring application server 360 and/or the control unit 310 over the network 305. The user device 350 may be configured to display a smart home user interface 352 that is generated by the user device 350 or generated by the monitoring application server 360. For example, the user device 350 may be configured to display a user interface (e.g., a web page) provided by the monitoring application server 360 that enables a user to perceive images captured by the camera 330 and/or reports related to the monitoring system. Although FIG. 6 illustrates two user devices for brevity, actual implementations may include more (and, perhaps, many more) or fewer user devices.

In some implementations, the one or more user devices 340 and 350 communicate with and receive monitoring system data from the control unit 310 using the communication link 338. For instance, the one or more user devices 340 and 350 may communicate with the control unit 310 using various local wireless protocols such as Wi-Fi, Bluetooth, Zwave, Zigbee, HomePlug (ethernet over powerline), or wired protocols such as Ethernet and USB, to connect the one or more user devices 340 and 350 to local security and automation equipment. The one or more user devices 340 and 350 may connect locally to the monitoring system and its sensors and other devices. The local connection may improve the speed of status and control communications because communicating through the network 305 with a remote server (e.g., the monitoring application server 360) may be significantly slower.

Although the one or more user devices 340 and 350 are shown as communicating with the control unit 310, the one or more user devices 340 and 350 may communicate directly with the sensors and other devices controlled by the control unit 310. In some implementations, the one or more user devices 340 and 350 replace the control unit 310 and perform the functions of the control unit 310 for local monitoring and long range/offsite communication.

In other implementations, the one or more user devices 340 and 350 receive monitoring system data captured by the control unit 310 through the network 305. The one or more user devices 340, 350 may receive the data from the control unit 310 through the network 305 or the monitoring application server 360 may relay data received from the control unit 310 to the one or more user devices 340 and 350 through the network 305. In this regard, the monitoring application server 360 may facilitate communication between the one or more user devices 340 and 350 and the monitoring system.

In some implementations, the one or more user devices 340 and 350 may be configured to switch whether the one or more user devices 340 and 350 communicate with the control unit 310 directly (e.g., through link 338) or through the monitoring application server 360 (e.g., through network 305) based on a location of the one or more user devices 340 and 350. For instance, when the one or more user devices 340 and 350 are located close to the control unit 310 and in range to communicate directly with the control unit 310, the one or more user devices 340 and 350 use direct communication. When the one or more user devices 340 and 350 are located far from the control unit 310 and not in range to communicate directly with the control unit 310, the one or more user devices 340 and 350 use communication through the monitoring application server 360.

Although the one or more user devices 340 and 350 are shown as being connected to the network 305, in some implementations, the one or more user devices 340 and 350 are not connected to the network 305. In these implementations, the one or more user devices 340 and 350 communicate directly with one or more of the monitoring system components and no network (e.g., Internet) connection or reliance on remote servers is needed.

In some implementations, the one or more user devices 340 and 350 are used in conjunction with only local sensors and/or local devices in a house. In these implementations, the system 300 only includes the one or more user devices 340 and 350, the sensors 320, the module 322, the camera 330, and the robotic devices. The one or more user devices 340 and 350 receive data directly from the sensors 320, the module 322, the camera 330, and the robotic devices and sends data directly to the sensors 320, the module 322, the camera 330, and the robotic devices. The one or more user devices 340, 350 provide the appropriate interfaces/processing to provide visual surveillance and reporting.

In other implementations, the system 300 further includes network 305 and the sensors 320, the module 322, the camera 330, the thermostat 334, and the robotic devices are configured to communicate sensor and image data to the one or more user devices 340 and 350 over network 305 (e.g., the Internet, cellular network, etc.). In yet another implementation, the sensors 320, the module 322, the camera 330, the thermostat 334, and the robotic devices (or a component, such as a bridge/router) are intelligent enough to change the communication pathway from a direct local pathway when the one or more user devices 340 and 350 are in close physical proximity to the sensors 320, the module 322, the camera 330, the thermostat 334, and the robotic devices to a pathway over network 305 when the one or more user devices 340 and 350 are farther from the sensors 320, the module 322, the camera 330, the thermostat 334, and the robotic devices. In some examples, the system leverages GPS information from the one or more user devices 340 and 350 to determine whether the one or more user devices 340 and 350 are close enough to the sensors 320, the module 322, the camera 330, the thermostat 334, and the robotic devices to use the direct local pathway or whether the one or more user devices 340 and 350 are far enough from the sensors 320, the module 322, the camera 330, the thermostat 334, and the robotic devices that the pathway over network 305 is required. In other examples, the system leverages status communications (e.g., pinging) between the one or more user devices 340 and 350 and the sensors 320, the module 322, the camera 330, the thermostat 334, and the robotic devices to determine whether communication using the direct local pathway is possible. If communication using the direct local pathway is possible, the one or more user devices 340 and 350 communicate with the sensors 320, the module 322, the camera 330, the thermostat 334, and the robotic devices using the direct local pathway. If communication using the direct local pathway is not possible, the one or more user devices 340 and 350 communicate with the sensors 320, the module 322, the camera 330, the thermostat 334, and the robotic devices using the pathway over network 305.

In some implementations, the system 300 provides end users with access to images captured by the camera 330 to aid in decision making. The system 300 may transmit the images captured by the camera 330 over a wireless WAN network to the user devices 340 and 350. Because transmission over a wireless WAN network may be relatively expensive, the system 300 uses several techniques to reduce costs while providing access to significant levels of useful visual information.

In some implementations, a state of the monitoring system and other events sensed by the monitoring system may be used to enable/disable video/image recording devices (e.g., the camera 330). In these implementations, the camera 330 may be set to capture images on a periodic basis when the alarm system is armed in an "Away" state, but set not to capture images when the alarm system is armed in a "Stay" state or disarmed. In addition, the camera 330 may be triggered to begin capturing images when the alarm system detects an event, such as an alarm event, a door-opening event for a door that leads to an area within a field of view of the camera 330, or motion in the area within the field of view of the camera 330. In other implementations, the camera 330 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The invention claimed is:

1. A computer-implemented method comprising:
   determining that a visitor arrived at a premises;
   determining that the visitor used a computing device at a first time;
   determining that a user device of a person of the premises received a message at a second time;
   determining that a time period between the first time that the visitor used the computing device and the second time that the user device received the message satisfies a timing criteria; and
   in response to determining that the time period satisfies the timing criteria, sending, to the user device, a notification that indicates that the visitor arrived at the premises.

2. The method of claim 1, wherein determining that the time period satisfies the timing criteria comprises determining that the first time and the second time are at most a threshold time apart.

3. The method of claim 1, wherein determining that the visitor used the computing device at the first time comprises:
   analyzing, using object recognition, an image that depicts the visitor at the first time; and
   determining that the image depicts the visitor holding the computing device.

4. The method of claim 1, wherein determining that the visitor used the computing device at the first time comprises:
   analyzing an audio signal that encodes sound captured during at least the first time; and
   determining, using speech recognition, that the audio signal encodes a predetermined phrase.

5. The method of claim 1, comprising:
   determining that a second visitor arrived at the premises;
   determining that the second visitor used a second computing device at a third time;
   determining that a type of the second computing device is not a predetermined type; and
   in response to determining that the type of the second computing device is not the predetermined type, determining to skip sending, to a second user device of a second person of the premises, a second notification that indicates that the visitor has arrived at the premises.

6. The method of claim 1, comprising:
   determining that a second visitor arrived at the premises;
   determining that the second visitor did not use a second computing device within a threshold period of time of arriving at the premises; and
   in response to determining that the second visitor did not use the second computing device within the threshold period of time of arriving at the premises, determining to skip sending, to a second user device of a second person of the premises, a second notification that indicates that the visitor has arrived at the premises.

7. The method of claim 6, wherein the user device is the same user device as the second user device.

8. The method of claim 1, comprising:
determining that a second visitor arrived at the premises;
determining that the second visitor used a second computing device at a third time;
determining that a second user device of a second person of the premises received a second message at a fourth time;
determining that a second time period between the third time and the fourth time does not satisfy the timing criteria; and
in response to determining that the second time period does not satisfy the timing criteria, determining to skip sending, to the second user device, a second notification that indicates that the visitor has arrived at the premises.

9. The method of claim 8, wherein the second user device is a different user device than the user device.

10. A system comprising one or more computers and one or more storage devices on which are stored instructions that are operable, when executed by the one or more computers, to cause the one or more computers to perform operations comprising:
determining that a visitor arrived at a premises;
determining that the visitor used a computing device at a first time;
determining that a user device of a person of the premises received a message at a second time;
determining that a time period between the first time that the visitor used the computing device and the second time that the user device received the message satisfies a timing criteria; and
in response to determining that the time period satisfies the timing criteria, sending, to the user device, a notification that indicates that the visitor arrived at the premises.

11. The system of claim 10, wherein determining that the time period satisfies the timing criteria comprises determining that the first time and the second time are at most a threshold time apart.

12. The system of claim 10, wherein determining that the visitor used the computing device at the first time comprises:
analyzing, using object recognition, an image that depicts the visitor at the first time; and
determining that the image depicts the visitor holding the computing device.

13. The system of claim 10, wherein determining that the visitor used the computing device at the first time comprises:
analyzing an audio signal that encodes sound captured during at least the first time; and
determining, using speech recognition, that the audio signal encodes a predetermined phrase.

14. The system of claim 10, the operations comprising:
determining that a second visitor arrived at the premises;
determining that the second visitor used a second computing device at a third time;
determining that a type of the second computing device is not a predetermined type; and
in response to determining that the type of the second computing device is not the predetermined type, determining to skip sending, to a second user device of a second person of the premises, a second notification that indicates that the visitor has arrived at the premises.

15. The system of claim 10, the operations comprising:
determining that a second visitor arrived at the premises;
determining that the second visitor did not use a second computing device within a threshold period of time of arriving at the premises; and
in response to determining that the second visitor did not use the second computing device within the threshold period of time of arriving at the premises, determining to skip sending, to a second user device of a second person of the premises, a second notification that indicates that the visitor has arrived at the premises.

16. The system of claim 15, wherein the user device is the same user device as the second user device.

17. The system of claim 10, the operations comprising:
determining that a second visitor arrived at the premises;
determining that the second visitor used a second computing device at a third time;
determining that a second user device of a second person of the premises received a second message at a fourth time;
determining that a second time period between the third time and the fourth time does not satisfy the timing criteria; and
in response to determining that the second time period does not satisfy the timing criteria, determining to skip sending, to the second user device, a second notification that indicates that the visitor has arrived at the premises.

18. The system of claim 17, wherein the second user device is a different user device than the user device.

19. A non-transitory computer-readable storage medium encoded with instructions that, when executed by one or more computers, cause the one or more computers to perform operations comprising:
determining that a visitor arrived at a premises;
determining that the visitor used a computing device at a first time;
determining that a user device of a person of the premises received a message at a second time;
determining that a time period between the first time that the visitor used the computing device and the second time that the user device received the message satisfies a timing criteria; and
in response to determining that the time period satisfies the timing criteria, sending, to the user device, a notification that indicates that the visitor arrived at the premises.

20. The non-transitory computer-readable storage medium of claim 19, wherein determining that the time period satisfies the timing criteria comprises determining that the first time and the second time are at most a threshold time apart.

* * * * *